United States Patent [19]

Dodak

[11] Patent Number: 5,707,049
[45] Date of Patent: Jan. 13, 1998

[54] POWER STEERING GEAR FOR MOTOR VEHICLE

[75] Inventor: Tony Michael Dodak, Birch Run, Mich.

[73] Assignee: General Motors Corporation, Detroit, Mich.

[21] Appl. No.: 553,732

[22] Filed: Oct. 23, 1995

[51] Int. Cl.$^6$ .................................................. B62D 5/08
[52] U.S. Cl. .................. 267/273; 91/375 A; 74/388 PS; 180/441
[58] Field of Search ...................... 267/273, 150, 267/154, 284; 91/375 A; 74/388 PS; 464/97; 180/417, 441

[56] References Cited

U.S. PATENT DOCUMENTS

| 2,131,532 | 9/1938 | Christian | 188/250 R |
|---|---|---|---|
| 3,998,131 | 12/1976 | Adams | 91/372 |
| 4,273,029 | 6/1981 | Sheppard | 91/422 |
| 4,279,323 | 7/1981 | Ando et al. | 180/148 |
| 4,373,598 | 2/1983 | Elser | 180/143 |
| 4,774,847 | 10/1988 | Breitweg | 74/388 PS |
| 4,819,545 | 4/1989 | Dymond | 91/371 |
| 4,966,192 | 10/1990 | Umeda | 137/625.23 |
| 5,070,958 | 12/1991 | Goodrich, Jr. et al. | 74/388 PS X |
| 5,115,879 | 5/1992 | Imura et al. | 180/149 |
| 5,230,273 | 7/1993 | Fraley, Jr. | 91/371 |
| 5,233,906 | 8/1993 | Bishop et al. | 91/375 A |
| 5,251,669 | 10/1993 | Bishop | 137/625.23 |
| 5,562,016 | 10/1996 | Schoffel | 180/417 X |
| 5,571,238 | 11/1996 | Breitweg et al. | 91/375 A |

*Primary Examiner*—Josie Ballato
*Attorney, Agent, or Firm*—Saul Schwartz

[57] ABSTRACT

A power steering gear including a spool shaft, a pinion head, a torsion bar between the spool shaft and the pinion head, and a rotary detent which resists twisting of the torsion bar including an annular first ball seat rotatable as a unit with a pinion head end of the torsion bar, an annular second ball seat facing the first ball seat, a plurality of detent notches in the first and second ball seats facing each other in pairs, a plurality of detent balls between the facing pairs of detent notches, a plain cylindrical sleeve around the torsion bar rigidly connected at a first end thereof to the second ball seat, a pair of radial abutments on the torsion bar near a spool shaft end thereof, and a pair of cantilever springs at a second end of the cylindrical sleeve having lateral deflection strokes perpendicular to a longitudinal centerline of the torsion bar and ramps which resiliently capture therebetween the radial abutments. The ramps induce longitudinal thrust reactions between radial abutments and the cantilever springs proportional to the lateral deflection of the latter which bias the second ball seat toward the first ball seat.

4 Claims, 3 Drawing Sheets

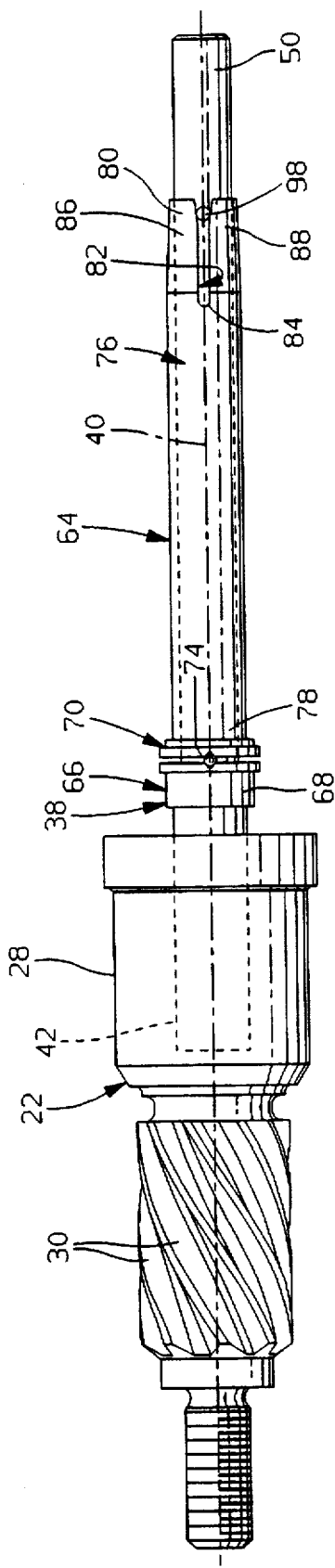
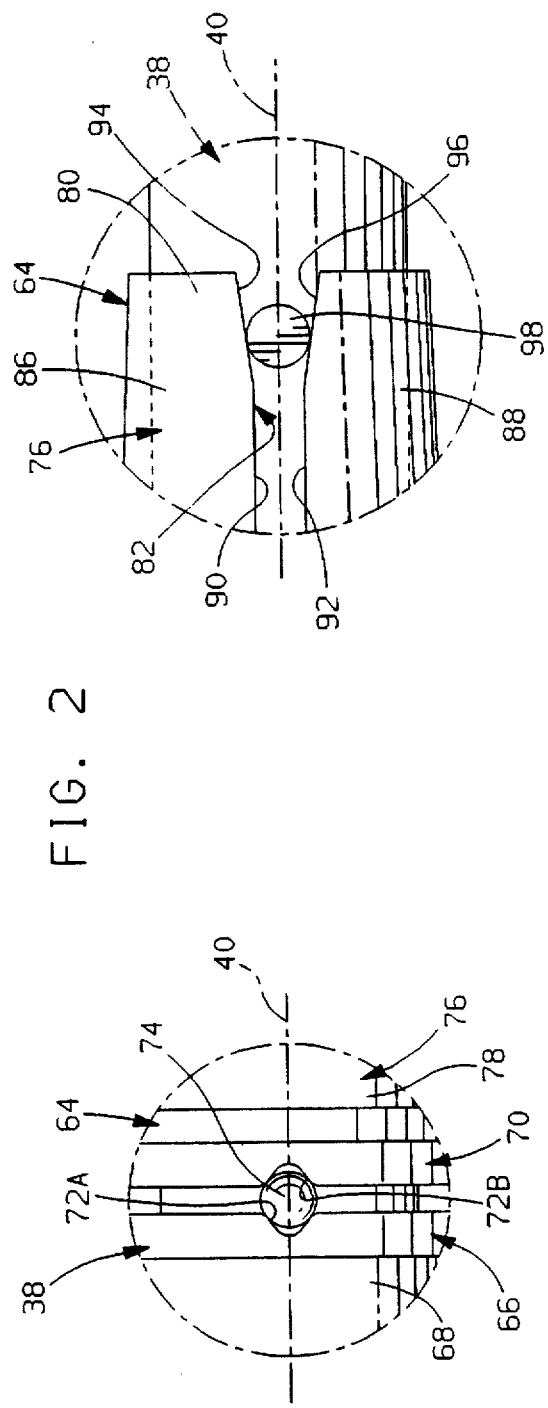
FIG. 2
FIG. 3B
FIG. 3A

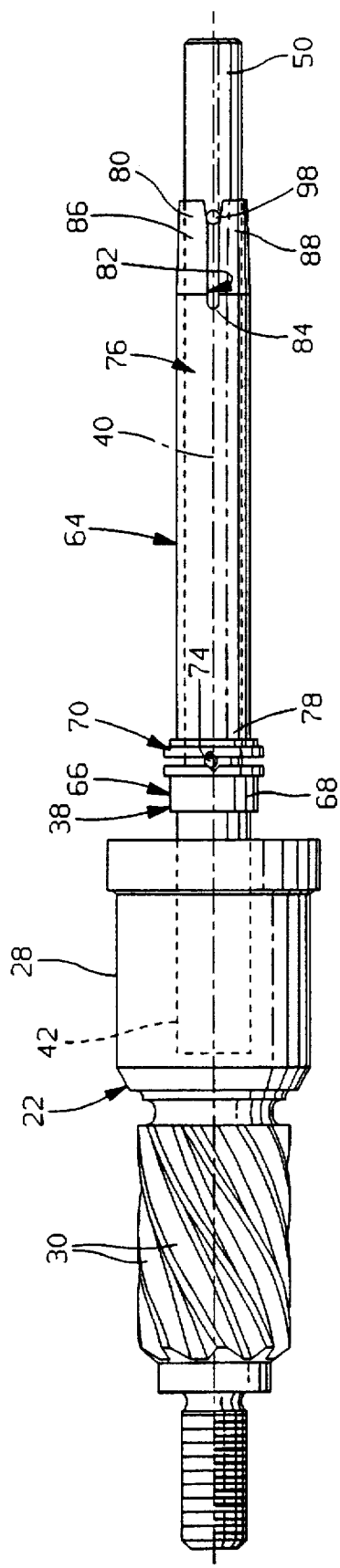
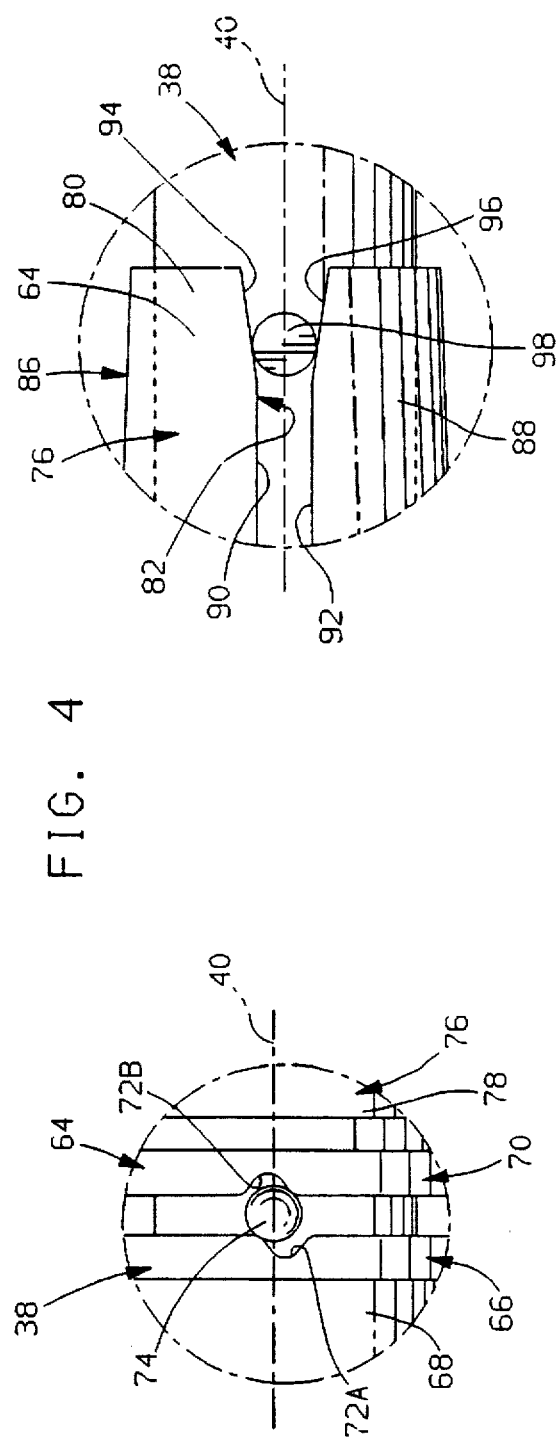
FIG. 4
FIG. 5B
FIG. 5A

POWER STEERING GEAR FOR MOTOR VEHICLE

FIELD OF THE INVENTION

This invention relates to motor vehicle power steering gears.

BACKGROUND OF THE INVENTION

Common power steering gears include a spool shaft connected to a manual steering wheel of a motor vehicle, a pinion head connected to steered wheels of the vehicle, a torsion bar resiliently centering the spool shaft relative to the pinion head, and a rotary control valve which directs hydraulic fluid to working chambers of a steering assist fluid motor in accordance with the direction and degree of twist of the torsion bar. U.S. Pat. No. 4,774,847 describes a steering gear mechanism consisting of a torsion bar and a rotary detent which resists twisting of the torsion bar including an annular first ball seat rigidly connected to one end of the torsion bar, an annular second ball seat facing the first ball seat and connected to the other end of the torsion bar for rotation as a unit therewith and for longitudinal translation relative thereto, detent notches in the first and second ball seats facing each other, detent balls in the detent notches, and a corrugated tubular spring biasing the second ball seat toward the first ball seat.

SUMMARY OF THE INVENTION

This invention is a new and improved power steering gear including a spool shaft connected to a manual steering wheel of a motor vehicle, a pinion head connected to steered wheels of the vehicle, a torsion bar between the spool shaft and the pinion head, a rotary control valve actuated when the torsion bar is twisted, and a rotary detent which resists twisting of the torsion bar. The rotary detent includes an annular first ball seat rotatable as a unit with a pinion head end of the torsion bar, an annular second ball seat facing the first ball seat, a plurality of detent notches in the first and second ball seats facing each other in pairs, a plurality of detent balls between the facing pairs of detent notches, a plain cylindrical sleeve around the torsion bar rigidly connected at a first end thereof to the second ball seat, a pair of radial abutments on the torsion bar near a spool shaft end thereof, and a pair of cantilever springs at a second end of the cylindrical sleeve having lateral deflection strokes perpendicular to a longitudinal centerline of the torsion bar and ramps which resiliently capture therebetween the radial abutments. The ramps induce longitudinal thrust reactions between radial abutments and the cantilever springs proportional to the lateral deflection of the latter which bias the second ball seat toward the first ball seat so that the rotary detent resists twisting of the torsion bar.

BRIEF DESCRIPTION OF THE DRAWINGS

FIG. 2 is an enlarged view of a portion of FIG. 1;

FIGS. 3A–3B are enlarged views of portions of FIG. 2;

FIG. 4 is similar to FIG. 2 showing elements of the power steering gear according to this invention in different relative positions; and FIGS. 5A–5B are enlarged views of portions of FIG. 4.

DESCRIPTION OF A PREFERRED EMBODIMENT

Figure 1:
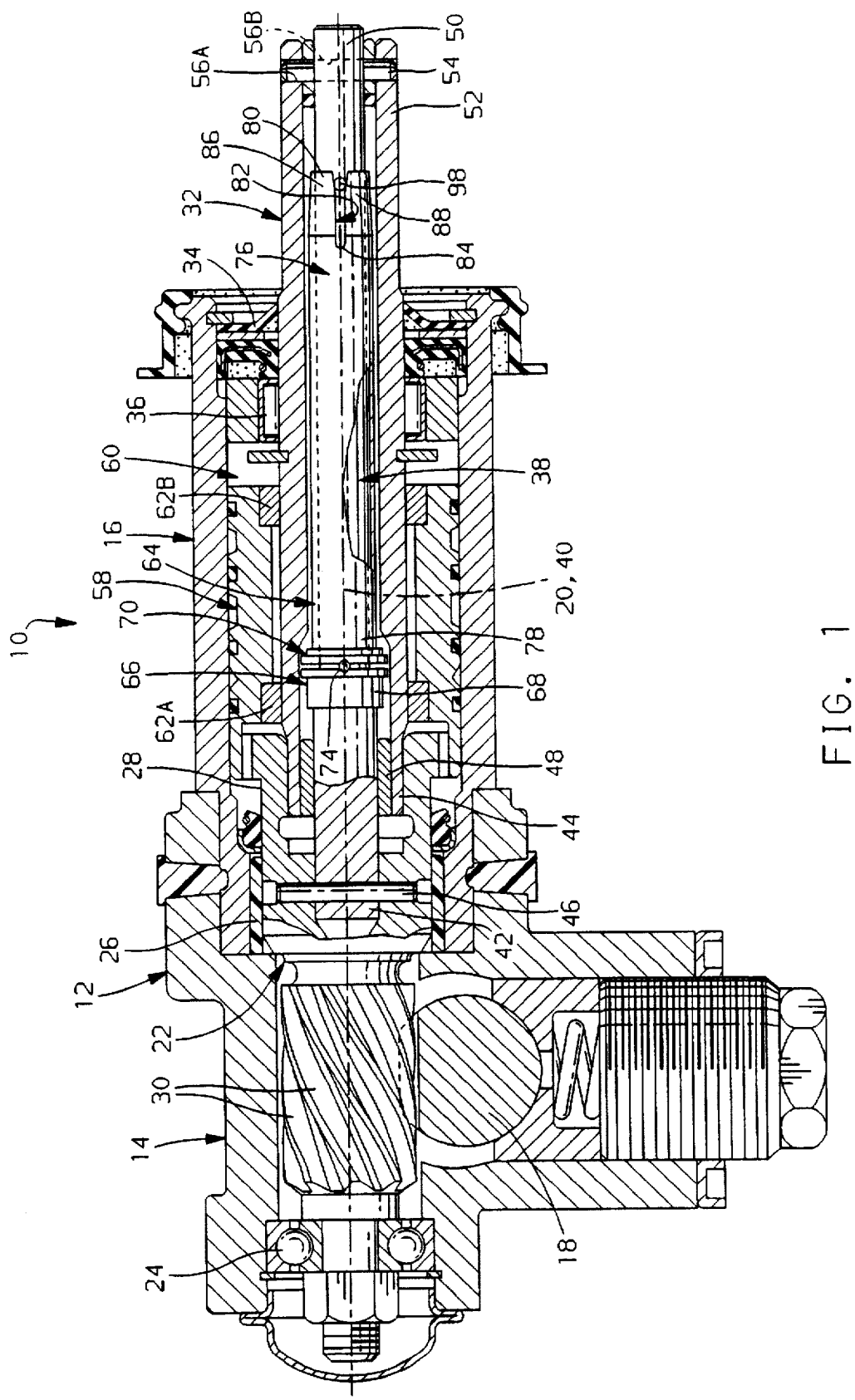
FIG. 1 is a partially broken-away longitudinal sectional view of a motor vehicle power steering gear according to this invention.

Referring to FIG. 1, a motor vehicle power steering gear 10 according to this invention includes a homing 12 consisting of a rack homing 14 and a valve housing 16 rigidly connected to the rack homing. A rack bar 18 is supported on the rack housing for lateral translation, i.e. perpendicular to a longitudinal centerline 20 of the housing 12, and is connected by linkage, not shown, to steered wheels of the motor vehicle. A pinion head 22 is supported on the rack housing 14 for rotation about the longitudinal centerline 20 by a ball bearing 24 and by a sleeve bearing 26 around a cylindrical journal 28 on the pinion head. A plurality of pinion gear teeth 30 on the pinion head 22 between the ball bearing 24 and the sleeve bearing 26 mesh with rack gear teeth, not shown, on the rack bar so that rotation of the pinion head effects concurrent lateral translation of the rack bar.

A cylindrical tubular spool shaft 32 projects into the valve housing 16 through a seal 34 on the latter and is supported on the valve housing for rotation about the centerline 20 of the steering gear housing by a roller bearing 36. A solid torsion bar 38 inside the spool shaft 32 has a longitudinal centerline 40 coincident with the longitudinal centerline 20 of the housing 12 and an inboard or pinion head end 42, FIG. 1, protruding beyond an inboard end 44 of the spool shaft 32. The pinion head end 42 of the torsion bar is rigidly connected to the pinion head 22 by a cross pin 46. A sleeve bearing 48 around the torsion bar cooperates with the roller bearing 36 in supporting the spool shaft on the valve housing 12 for rotation about the longitudinal centerline 20 of the housing.

An outboard or spool shaft end 50 of the torsion bar is rigidly connected to an outboard end 52 of the spool shaft 32 by a cross pin 54 seated in an aligned pair of cross bores 56A–B in the spool shaft and torsion bar, respectively. The outboard end 52 of the spool shaft 32 is connected to a manual steering wheel, not shown, of the motor vehicle for rotation as a unit therewith. The torsion bar 38 defines a center position, FIGS. 1–3, of the spool shaft 32 relative to the pinion head 22. When manual effort applied at the steering wheel of the vehicle rotates the spool shaft relative to the pinion head, the torsion bar is twisted between its pinion head end 42 and its spool shaft end 50 and induces a restoring force proportional to the amount of twist urging the spool shaft back to its center position relative to the pinion head.

A valve body 58 of a rotary control valve 60 of the steering gear 10 is rotatably supported on the spool shaft by a pair of seal rings 62A–B and is connected to the pinion head 22 for rotation as a unit therewith. The portion of the spool shaft 32 between the bearing tings 62A–B defines a valve spool of the rotary control valve having a plurality of outward opening slots, not shown, which cooperate with inward opening slots, not shown, in the valve body to define variable area orifices which direct hydraulic fluid to a steering assist fluid motor when the spool shaft 32 rotates relative to the pinion head 22. An open-center position of the valve spool relative to the valve body is characterized by all of the aforesaid variable area orifices being equally open and coincides with the center position of the spool shaft relative to the pinion head. U.S. Pat. No. 4,454,801, issued 19 Jun. 1984 and assigned to the assignee of this invention, may be referred to for a full and complete description of a corresponding rotary control valve.

The rotary control valve 60 is hydraulically balanced before the cross pin 54 is installed by rotating the spool shaft 32 to its center position relative the pinion head 22. Then, the cross bores 56A–B are drilled together through the spool shaft and the torsion bar and the cross pin 54 is inserted so that an undeflectected or center position of the torsion bar corresponds exactly to the center position of the spool shaft relative to the pinion head and the open-center position of the valve spool relative to the valve body.

A rotary detent 64 is interposed between the pinion head end 42 of the torsion bar and the spool shaft end 50 thereof after the rotary control valve is hydraulically balanced and includes an annular first ball seat 66 having a cylindrical collar 68 welded or pressed to the torsion bar 38 near the pinion head end 42 thereof. The first ball seat 66 and an annular second ball seat 70 of the rotary detent each have a plurality of detent notches arranged in facing pairs, only a single facing pair of detent notches 72A-B in the first and second ball seats, respectively, being visible in FIGS. 1, 2, 3A, 4 and 5A. A corresponding plurality of detent balls are disposed between the facing pairs of detent notches, only a single detent ball 74 being visible in FIGS. 1, 2, 3A, 4 and 5A.

As seen best in FIGS. 1, 2, 3B 4 and 5B, the rotary detent 64 further includes a plain cylindrical metal sleeve 76 in the annulus between the torsion bar 38 and the spool shaft 32 having a first end 78 rigidly connected to the second ball seat 70 and an opposite second end 80. A first longitudinal slot 82 in the cylindrical sleeve 76 is open through the second end 80 of the sleeve and closed at a bottom 84 of the slot. A second longitudinal slot, not shown, in the cylindrical sleeve 76 is diametrically opposite and identical to the first longitudinal slot 82. The first and second longitudinal slots are collectively referred to below as longitudinal slots 82.

A first arc-shaped segment of the cylindrical sleeve 76 between the longitudinal slots 82 therein defines an integral first cantilever spring 86 at the second end of the cylindrical sleeve having a deflection stroke perpendicular to the longitudinal centerline 40 of the torsion bar 38. A second arc-shaped segment of the cylindrical sleeve 76 opposite the first arc-shaped segment defines a second integral cantilever spring 88 at the second end of the cylindrical sleeve having a deflection stroke perpendicular to the longitudinal centerline of the torsion bar.

Each of the longitudinal slots 82 has a first edge 90 defining opposite sides of the first cantilever spring 86 and a second edge 92 defining opposite sides of the second cantilever spring 88. Each of the first edges 90 has a portion contoured to define a first ramp 94, FIGS. 3B, 5B. Each of the second edges 92 has a portion contoured to define a second ramp 96 facing the first ramp. The first and second ramps 94, 96 diverge or flare outward toward the second end 80 of the sleeve 76.

A cylindrical rod 98 is rigidly attached to the torsion bar 38 near the spool shaft end 50 thereof in a plane perpendicular to the longitudinal centerline 40. The length of the rod 98 exceeds the diameter of the spool shaft end of the torsion bar so that opposite ends of the rod define radial abutments in the longitudinal slots 82 between the ramps 94, 96. The diameter of the rod 98 exceeds the span between the ramps 94, 96 so that the first and second cantilever springs 86, 88 are deflected laterally outward to resiliently capture therebetween or preload each of the radial abutments.

The outward flare of the ramps 94, 96 and the tangential engagement thereof on the corresponding one of the radial abutments therebetween cooperate to convert lateral outward deflection of the first and second cantilever springs 86, 88 into longitudinal thrust on the cylindrical sleeve 76 and on the second ball seat 70 toward the first ball seat 66. The longitudinal thrust, in ram, clamps the detent notches 72A-B around the detent balls 74 so that the rotary detent 64 constitutes a parallel torque path between the spool shaft end 50 and the pinion head end 42 of the torsion bar. The longitudinal thrust induced by the first and second cantilever springs increases with increasing lateral deflection of the cantilever springs.

In operation, manual effort applied at the steering wheel to turn the spool shaft in one direction or the other applies torque to the spool shaft end 50 of the torsion bar to twist the latter in the same direction and, through the radial abutments at the ends of the rod 98, to the cylindrical sleeve 76 to rotate the latter about the centerline 40 in the same direction. The longitudinal thrust induced by the cantilever springs 86, 88 is calculated to initially maintain the derera balls 74 fully seated in the detent notches 72A-B so that the pinion head end 42 of the torsion bar is constrained to rotate as a unit with the spool shaft end 50 thereof. Accordingly, the torsion bar is prevented from twisting and the valve spool of the rotary control valve remains in its open-center position relative to the valve body and the vehicle is steered substantially manually, i.e. without power assist, through the rotary detent 64.

As the magnitude of manual effort applied at the steering wheel increases, such as during low speed maneuvering, longitudinal thrust exerted by the detent balls 74 on the second ball seat 70 increases in magnitude and the second ball seat commences longitudinal separation from the first ball seat 66 against the bias of the fast and second cantilever springs 86, 88. Concurrently, the second ball seat 70 rotates relative to the first ball seat 66 about the longitudinal centerline 40, the torsion bar 38 twists between its spool shaft end 50 and its pinion head end 42, and the detent balls 74 roll up the sides of the detent notches 72A-B, FIGS. 4, 5A. As the spool shaft 32 rotates with the spool shaft end 50 of the torsion bar relative to the pinion head 22, the valve spool of the rotary control valve rotates relative to the valve body 58 to initiate power assist.

At the same time, the cylindrical sleeve 76 translates longitudinally toward the spool shaft end 50 of the torsion bar as the second ball seat 70 separates longitudinally from the first ball seat 66. The radial abutments defined by the ends of the rod 98, therefore, simultaneously traverse the ramps 94, 96 toward the bottoms 84 of the longitudinal slots 82. The ramps are contoured to assure that the cantilever springs 86, 88 continuously induce longitudinal thrust on the cylindrical sleeve 76 so that when manual effort on the steering wheel is released, the detent balls 74 are forced back to the bottoms of the detent notches 72A-B concurrently with rerun of the torsion bar 38 to its center position. The ramps 94, 96 may be further shaped or contoured to reduce the magnitude of the longitudinal thrust attributable to the first and second cantilever springs 86, 88 after a predetermined number of degrees of relative rotation between the first and second ball seats 66, 70 has occurred.

I claim:

1. A motor vehicle power steering gear including a housing, a spool shaft and a pinion head each supported on said housing for rotation about a centerline thereof relative to the other, a torsion bar having a pinion head end rigidly connected to said pinion head and a spool shaft end rigidly connected to said spool shaft defining a center position of said spool shaft relative to said pinion head when said torsion bar is straight and inducing a restoring force on said spool shaft toward said center position when said torsion bar is twisted, and a rotary detent between said pinion head end of said torsion bar and said spool shaft end thereof operative to resist twisting of said torsion bar, characterized in that said rotary detent comprises an annular first ball seat rigidly attached to said torsion bar at said pinion head end thereof, an annular second ball seat, a plurality of detent notches in each of said first and said second ball seats arranged in facing pairs, a corresponding plurality of detent balls seated in respective ones of said facing pairs of detent notches, a cylindrical sleeve around said torsion bar having a first end rigidly connected to said second ball seat and a second end opposite said first end, a pair of diametrically opposite radial abutments on said torsion bar, a first cantilever spring and a second cantilever spring on said cylindrical sleeve at said second end thereof each having a lateral deflection stroke and each resiliently engaging each of said radial abutments so that said radial abutments are resiliently clamped between said first and said second cantilever springs, and ramp means on each of said first and said second cantilever springs cooperating with said radial abutments to induce a longitudinal thrust on said cylindrical sleeve toward said first ball seat which increases with increasing lateral deflection of said cantilever springs.

2. The motor vehicle power steering gear recited in claim 1 wherein:

each of said first and said second cantilever springs is integral with said cylindrical sleeve.

3. The motor vehicle power steering gear recited in claim 2 further comprising:

a first longitudinal slot in said cylindrical sleeve extending from said second end thereof to a closed bottom of said first longitudinal slot, and a second longitudinal slot in said cylindrical sleeve parallel to said first longitudinal slot diametrically opposite to said furst longitudinal slot extending from said second end thereof to a closed bottom of said second longitudinal slot, said first integral cantilever spring being defined on a first side of each of said fast and said second longitudinal slots and said second integral cantilever spring being defined on a second side of each of said first and said second longitudinal slots.

4. The motor vehicle power steering gear recited in claim 3 wherein said ramp means on each of said first and said second cantilever springs cooperating with said radial abutments to induce a longitudinal thrust on said cylindrical sleeve toward said first ball seat comprises:

a first ramp on a first edge of each of said first and said second longitudinal slots flaring laterally outward toward said second end of said cylindrical sleeve, and a second ramp on a second edge of each of said first and said second longitudinal slots facing said first ramp and flaring laterally outward toward said second end of said cylindrical sleeve.

* * * * *